UNITED STATES PATENT OFFICE.

WILLIAM LAWRENCE TURNER, OF ATHERSTONE, ENGLAND.

MANUFACTURE OF STEEL OR FERRO ALLOYS.

1,325,455.  Specification of Letters Patent.  Patented Dec. 16, 1919.

No Drawing. Application filed October 1, 1918. Serial No. 256,427.

*To all whom it may concern:*

Be it known that I, WILLIAM LAWRENCE TURNER, a subject of the King of England, and residing at Atherstone, in the county of Warwick, England, have invented Improvements in or Connected with the Manufacture of Steel or Ferro Alloys, of which the following is a specification.

This invention has reference primarily to the production of steel or ferro-alloys, and more especially that kind of steel known as "high speed tool steel," in the constitution of which metals such as tungsten, chromium, vanadium, titanium, cobalt, molybdenum, or the like enter.

It is well understood that these species of steels are very expensive, and that it is very desirable in view of their practical necessity in manufactures and industry alone, that the cost should be reduced, and several attempts and suggestions for the reduction of the cost of such steels have been made, and I, in a former patent application of mine, Serial No. 210,698, have described a method or process of making such steels by what is generally called the alumino-thermic process or principle, by which the cost of their production is reduced, and which consists mainly in the direct production of such steels by the one process or operation of the chemical reaction of aluminium, magnesium, silicon, or like substances, with oxids, sulfids, chlorids or salts of chromium, vanadium, tungsten, cobalt, molybdenum, or like metals or any of them in conjunction with iron or steel— which forms the predominant constituent of such steel to be made—and carbon; and in the production of such steels by that process or method, some of the substances are employed in the whole mixture as what I term "thermit mixtures," and one or more in the form of iron or ferro-alloys of metals, the term "thermit mixture" being used to designate chemically equivalent mixtures of the metal oxids, sulfids, chlorids, or salts referred to, and the aluminium or other reducing metal, whereas "thermit" has been heretofore generally used to mean the mixture alone or iron oxid, and aluminium.

Now my present object for the further diminution of the cost of steels of the species concerned, is accomplished by the application and use in the mixture with the iron or steel and carbon, in the alumino-thermic mixture employed, or the practical waste product known as "high speed steel hammer scale," being the product resulting from the hammering, forging, or rolling of high speed steel as made in the ordinary way, the quantities of these substances being used according to their chemical equivalent. That is to say, the invention consists of the use in combination of an "alumino-thermic" chemically equivalent mixture of aluminium, magnesium, silicon, or like substances, carbon (preferably in iron or steel or other metal containing it); and the said waste product known as "high speed steel hammer scale;" with or without extra iron or steel according to the analysis of steel required. I have found that the use and application of this waste material when employed in the chemically equivalent or "thermic mixture," furnishes the necessary or required tungsten or molybdenum, and other alloying metals which are customarily used, for the production of a high speed steel of good quality and character.

This "high speed hammer scale" of ordinary high speed steel, I have found generally contains approximately about 80% of oxid of iron, and about 14% of oxid of tungsten, with a smaller percentage of oxid of chronium, vanadium, molybdenum, cobalt, manganese, silicon, corresponding with the metals used in the manufacture of the high speed steel; and under this invention, in the mixture used, the proportion of hammer scale in relation to the iron or steel, and the aluminium or equivalent metal, will be such as will give a composition of ingredients in the steel produced, depending upon or according to the particular character of a high speed steel required; and certain known metallic or non-metallic substances may be added to the mixtures employed for this purpose of regulating the final composition of the steel, or the intensity of reaction, or both; and in order to introduce carbon, such carbon may be introduced with pig iron or cast iron or ferro-chrome or other carbon containing material.

Further, in some cases, where it is required to have silicon or manganese in the high speed steel, such materials may be introduced as ferro-silicon or ferro-manganese; and these should preferably be introduced after the alumino-thermic reaction, to the final metal produced thereby; and where any particular ingredient of the hammer scale is not in a sufficiently high percentage, say where the tungsten oxid does not run sufficiently high, tungsten oxid will be added to the mixture of the hammer scale, etc., in order to bring up the final tungsten content of the final steel produced to the required degree; and similarly, where other metals required are not present in this scale, or not present in sufficient quantity, and are required in certain degrees or proportions in the final metal, the oxids, sulfids, chlorids, or salts of such metals will be added to the mixture to be brought into reaction.

An illustration of constituents used for the manufacture of a high speed tool steel of an average character is given in the following list:—

100 lbs. of high speed steel hammer scale, in a suitable small state of division—analyzing approximately 80% of oxid of iron, 14% oxid of tungsten, the balance consisting chiefly of oxids of chromium, vanadium, silicon, manganese, etc., such scale being free as possible from admixtures of sand and other impurities.

4½ lbs. of ferro-chromium, in a small state of division, of the commercial grade containing about 60% chromium, 8% to 10% of carbon.

10 lbs. of wrought iron, or mild steel, preferably in a small state of division.

28¼ lbs. of aluminium in a small state of division.

The whole mixture may be set into reaction in a crucible or furnace in the manner in which the alumino-thermic reaction is carried out, or in any other suitable way; and the resultant fluid steel would be tapped or poured off and cast into the form desired, such as an ingot, and ultimately dealt with in any way according to the use to which such steel is to be put or required.

According to the desired quality of the ultimate steel, and having regard to the intensity or heat of the reaction in particular circumstances, a limited quantity of "high speed steel scrap," preferably in a more or less small state of division, may be added to the mixture, the heat of the reaction being of course utilized in re-melting and recovering this in the final steel produced.

While the invention has been described as applied to the manufacture of "high speed tool steel," magnet steel or similar steels, the composition of which involves the use of ferro-alloying metals such as tungsten or molybdenum, may be produced by the combination of constituents specified, the proportions of the constituents being modified to suit the requirements of the different characters of steel.

Having thus described my invention, I claim:

1. The herein described method of producing an alloy-steel, which consists in combining a reducing metal, high speed steel hammer scales, and iron or mild steel, and heating the mass to a reaction temperature.

2. The herein described method of producing an alloy-steel, which consists in combining a reducing metal, iron or mild steel and high speed steel hammer scales, the high speed steel hammer scales being present in a preponderance by weight to the combined weight of the other elements, and heating the mass to a reaction temperature.

In testimony whereof I have signed my name to this specification in the presence of two subscribing witnesses.

WILLIAM LAWRENCE TURNER.

Witnesses:
SOMERVILLE GOODALL,
ELSIE EVELYN JORDAN.